Aug. 4, 1925.

H. M. CAMERON

PORTABLE SCALE

Filed Feb. 7, 1924 — 2 Sheets-Sheet 1

Hugh M. Cameron
INVENTOR.
BY Dyer & Taylor
ATTORNEYS.

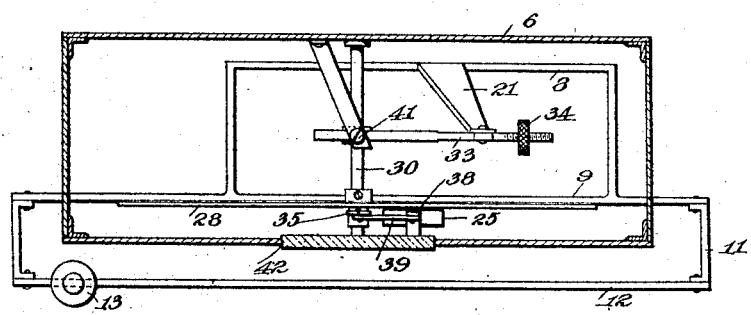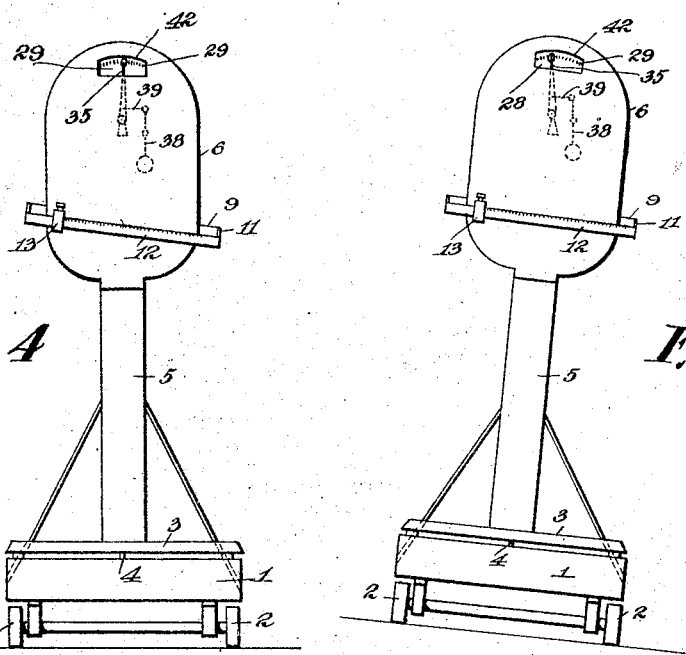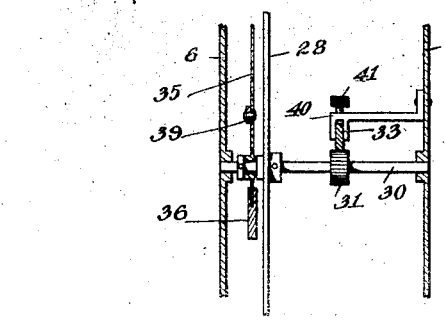

Patented Aug. 4, 1925.

1,548,183

UNITED STATES PATENT OFFICE.

HUGH M. CAMERON, OF WOODHAVEN, NEW YORK.

PORTABLE SCALE.

Application filed February 7, 1924. Serial No. 691,157.

*To all whom it may concern:*

Be it known that I, HUGH M. CAMERON, a citizen of the United States, and a resident of Woodhaven, borough of Queens, county of Queens, city and State of New York, have invented a certain new and useful Portable Scale, of which the following is a specification.

The invention relates to platform scales and more particularly to such devices capable of being moved from place to place, and which are usually mounted on wheels to facilitate the portability of the apparatus.

The objects of the invention are to provide a device of the character described, which will be self-balancing; which will be light in weight; simple and rugged in construction; having but few parts, having but one weighing lever; in which the moving weight (specific gravity) of the entire device is so distributed about its center as to avoid hesitation in starting, and oscillatory movement in coming to rest; in which the pull of the load is compensated for on the weighing lever; in which the indicating media are carried in rigid bearings; in which a light compensating weight may be employed; in which the resistance value of the weighing lever is automatically changed as the load varies; in which the indicating media will remain at balance irrespective of the position of the device, and in which the indicating media are enclosed within the scale casing.

These and further objects will more fully appear in the following specification and accompanying drawings considered together or separately.

One embodiment of the invention is illustrated in the accompanying drawings, in which like parts in all of the several figures are designated by corresponding characters of reference, and in which—

Fig. 3 is a similar view taken on the line 3—3 of Fig. 2.

Fig. 4 is a front elevation of a scale embodying the invention.

Fig. 5 is a similar view showing the device tipped at an angle, and

Fig. 6 is a detail sectional view taken on the line 6—6 of Fig. 2.

Figure 1:
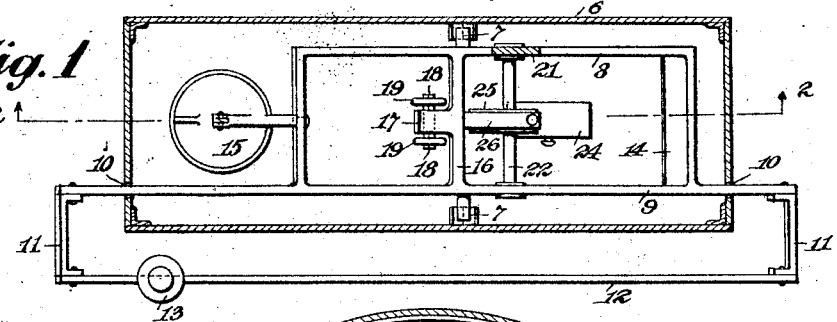
Fig. 1 is a longitudinal sectional view of a portion of a scale, taken on the line 1—1 of Fig. 2.
Figure 2:
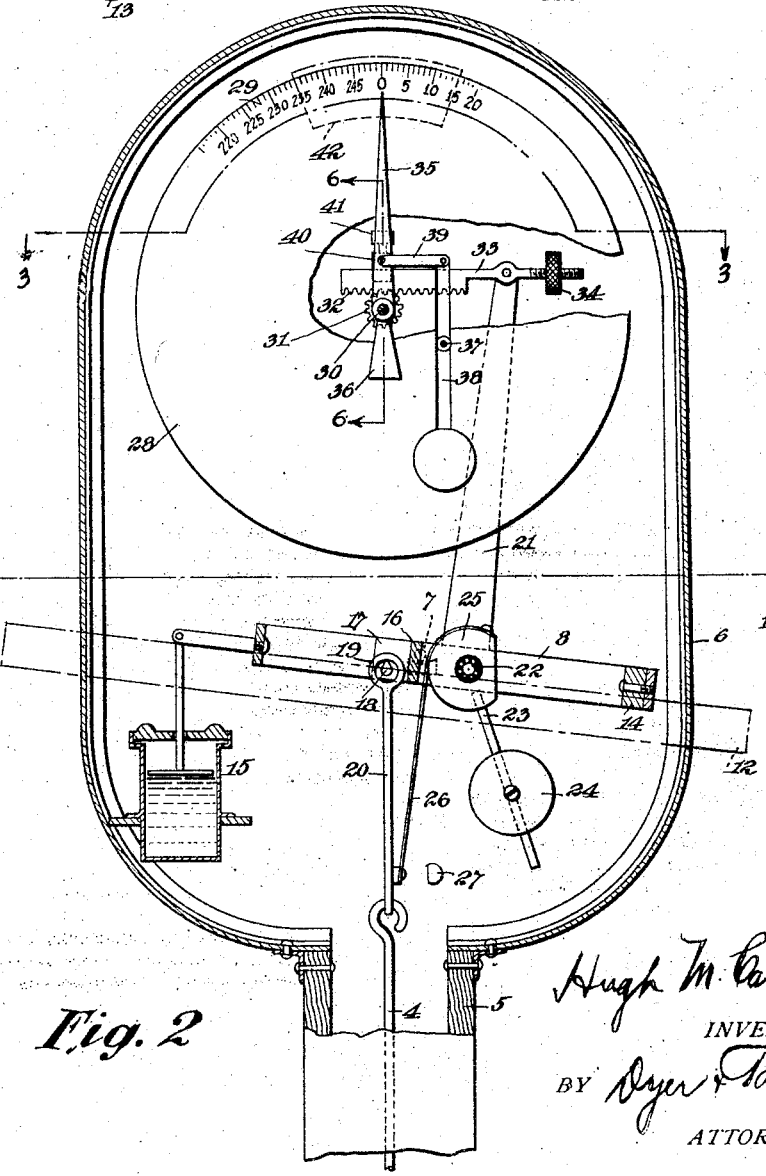
Fig. 2 is a horizontal section taken on the line 2—2 of Fig. 1.

The position of the scale in Fig. 5 is very much exaggerated in order to show the movement of the zero point on the dial, and of the telltale. In the position shown the platform could not level itself, and consequently, no effort has been made to show the same in proper position.

In the drawings 1 designates a box-like frame mounted on wheels 2 as is common. Within the frame 1 is disposed the usual scale leverage upon which is carried the usual platform 3. One end of the leverage system is connected to a steelyard rod 4, which extends upward through a tubular post 5 carried at one end of the frame 1. Carried upon the upper end of the post, and in communication with the bore thereof, is a casing 6 in which is housed the indicating mechanism.

Mounted within the casing, and preferably on knife-edge bearings 7, is a weighing lever 8 which, in the embodiment of the invention illustrated, is a rectangular frame-like structure having one of its long sides 9 extended at both ends thereof. Said extended ends pass through slots 10 in the sides of the casing and carry at their ends forwardly extending arms 11 to the ends of which is secured a graduated capacity beam 12 carrying the usual poise and balancing weight 13. The beam will be outside of and parallel to the front of the casing. The beam 12 is placed below the pivot line of the lever 8 at proper distance to counterbalance the arm 21 and give the proper movement. One end of the lever 8 preferably carries a counterweight 14, and the opposite end thereof cooperates with a dash pot 15.

The lever 8 is provided with a cross-piece 16 carrying at its center a lug or projection 17 carrying oppositely disposed knife-edges 18 the latter being engaged within the upper open ends 19 of a shackle 20 to which the upper end of the steelyard rod 4 is attached.

The pivotal point of the shackle 20 is to one side of the pivotal point of the lever 8 as shown.

Extending upward from the lever 8, and from a point on the opposite side of the pivot 4 from the pivot of the shackle 20, is an arm 21 adapted to operate an indicating mechanism to be presently described.

Rigidly mounted in the lever 8, and extending across the same from side to side and on the same side of the pivot 7 of the lever as is the arm 21, is a shaft 22, and mounted on the outside of a circular row of balls or other anti-friction devices, and carried on the shaft is a pendulum lever 23 carrying a weight 24. The weight is secured to the lever by means of a screw whereby the position of the weight may be varied. The shaft 22 may, of course, be carried in ball bearings on the lever 8 and the "cam" be rigidly secured to the shaft, but the mounting illustrated is preferable for the reason that the device is much more sensitive.

The pendulum lever is of the first class, and the power end 25 thereof is in the form of a circular sector or "true cam." A flexible member 26, such for example, as a metal tape, is wound on the cylindrical surface of the power end 25 and secured at one end thereto. The opposite end of the element is preferably secured to the scale linkage through the shackle 20 and steelyard rod 4. It is to be understood that the tape 26 may be connected to the scale linkage in any other manner, or it may be anchored to a stationary part of the device, for example to a post 27 carried by the casing 6.

Rotatably mounted inside the casing 8, and preferable in proximity to the front side thereof, is a dial 28 having a graduated scale 29 thereon. Preferably the dial is rigidly mounted on a shaft 30 carried in bearings in the frame. The shaft carries a pinion 31 adapted to be engaged by a rack 32, the latter being carried on one end of a finger 33 pivoted to the upper end of the arm 21. The finger is pivoted between its ends, and that end opposite the rack carries an adjustable counter-weight 34 whereby the finger may be balanced.

Loosely mounted on the shaft 30 inside the casing 8 and in proximity to the face of the dial 28 is a telltale pointer 35 having a counter-weight 36 to normally maintain the pointer in the vertical position.

Pivoted at 37 to the inside of the front of the casing, and to one side of, and below the shaft 30 is a lever 38 having a weight at its lower end. Pivoted to the upper end of the lever is one end of a link 39, the opposite end of which is pivoted to the telltale above the pivot of the latter on the shaft.

The finger or bar 33 is held in position whereby its rack teeth will engage the teeth of the pinion 31 by means of a guide 40 within which the finger may move longitudinally. A screw 41 carried by the guide is adapted to engage the top of the finger to prevent the latter from jumping.

In the upper part of the front of the casing, and in line with the graduations 29 is a segmental window 42 whereby a portion of the dial will be visible, and said window may be glazed, as shown in Fig. 1, or the glazing may be omitted if desired.

The operation is as follows:—

In the drawings the scale is in normal position with no load on the platform, and the weighing end of the lever 8 is down. When a load is placed on the platform, the steelyard bar is pulled downward and the weighing end of the lever, and the pendulum 23 forming a part thereof, are moved upward a distance corresponding to the pull of the weight, the arm 21 and rack and pinion 31 and 32 will rotate the dial, and the movement of the dial relatively to the telltale 35 will indicate the weight.

The pull of the load is compensated for, and the lever caused to move in ratio, by means of the pendulum 23. As will be seen the pivot 7 of the lever is between the power point 18 and fulcrum of the pendulum, and as the power end of the lever 7 rises, the pendulum will be swung outward and upward to increase the weight in proportion to the movement of the lever.

When the device is supported on a level surface, or has been levelled, the telltale will be vertical, in alinement with the steelyard bar and with the zero mark on the dial, and the said mark will appear in the middle of the opening 42.

Should the scale rest on an uneven surface the post 5 will be off the vertical and, as the scale linkage in the vase 1 will automatically level itself, the zero mark on the dial will be moved to one side or the other of the center line of the post 5 and casing 6.

The telltale, being loosely carried on its shaft, will not be moved by the shifting of the scale linkage but its counterweight 36 will cause it to remain in the vertical position. The angular movement of the telltale will, because of its length relatively to the distance between the scale linkage and the shaft 30 be different from the angular movement of the dial and the swing of the weighted lever 38 and its connection with the telltale by means of the link 39, compensate for this difference in angularity and bring the telltale into coincidence with the zero mark.

The device is truly portable in that it is not necessary to level it. There are no floating bearings or pivots in the sense that such arrangements are used in the present form of scale. The bearings are "rigid," that is to say, they permit of rotary movement only. There is but one weighing lever. The capacity beam acts as a counterpoise for the weighing lever. The telltale always follows the zero mark on the dial.

The pendulum lever movement, compared with load value as against compensating value, functions in two directions. It furnishes resistance to the rise of the weighing lever, and acts as a weight (specific gravity) moving away from fulcrum of said lever.

The means for raising the weighted pendulum lever being carried across the fulcrum, and attached to the power side of the weighing lever tends to decrease the power, or permit of the use of a lighter weight to accomplish the same purpose.

The power end of the pendulum lever being a circle, the error induced by the travel thereof calculated under one of its functions as resistance value, is offset by the movement of the pendulum weight outward from the weighing lever fulcrum as a weight, or specific gravity, bearing on the lever when the short arm of the pendulum lever is equal to the short arm of the weighing lever, that is when the multiplication is the same.

The pivot of the pendulum lever 23 may be placed at any distance from the fulcrum of the lever 8, and the compensation for the pull of the load on the platform is increased or diminished relatively to the distance of the pendulum from the fulcrum 7.

The pendulum lever 23 may be of any length desired and the length thereof, or the distance of its pivot from the fulcrum 7 may determine the actual weight of the pendulum. The longer the pendulum, or the farther its pivot from the fulcrum 7, the lighter the pendulum need be.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed as new and desired to be secured by Letters Patent, is as follows:—

1. A scale comprising a lever of the first class, means pivoted on the weight end of the lever for compensating for the pull on the power end thereof, and means on the power end of the lever for moving the compensating means relatively to the lever.

2. A scale comprising a lever of the first class, means pivoted on the weight end of the lever for compensating for the pull on the power end thereof, and means on the power end of the lever for moving the compensating means relatively to and in the direction of the lever.

3. A scale comprising a weighing lever of the first class, a steelyard rod connected to the power end of the lever, a pendulum pivoted to the weight end of the lever, said pendulum being a lever of the first class, means operated by movement of the weighing lever for moving the pendulum in the direction of movement of the weight end of the weighing lever.

4. A scale comprising a platform mounted on a scale linkage, a weighing lever of the first class, draft mechanism connecting the power end of the lever to the linkage, a pendulum pivoted to the weight end of the lever, and means connected to the linkage for rocking the pendulum relatively to the weighing lever.

5. A scale comprising a platform mounted on a scale linkage, a weighing lever of the first class, draft mechanism connecting the power end of the lever to the linkage, a pendulum pivoted to the weight end of the lever, and means connected to the linkage for rocking the pendulum relatively to and in the direction of movement of the weighing lever.

6. A scale comprising a platform mounted on a scale linkage, a weighing lever of the first class, draft mechanism connecting the power end of the lever to the linkage, a pendulum pivoted to the weight end of the lever, said pendulum being a lever of the first class, and means connected to the power end of the pendulum lever and to the linkage for rocking the pendulum relatively to and in the direction of movement of the weighing lever.

7. A scale comprising a platform mounted on a scale linkage, a weighing lever of the first class, draft mechanism connecting the power end of the lever to the linkage, a pendulum pivoted to the weight end of the lever, said pendulum being a lever of the first class, the power end of the pendulum being a sector, a flexible member secured by one end to said end and lapping the circular face of the sector, the opposite end of said member being anchored independently of the weighing lever whereby movement of the said lever will rock the pendulum relatively to the lever.

8. A scale comprising a platform mounted on a scale linkage, a weighing lever of the first class, draft mechanism connecting the power end of the lever to the linkage, a pendulum pivoted to the weight end of the lever, said pendulum being a lever of the first class, the power end of the pendulum being a sector, a flexible member secured by one end to said end and lapping the circular face of the sector, the opposite end of said member being anchored to the linkage whereby movement of the said lever will rock the pendulum relatively to the lever.

9. A scale comprising a platform mounted on a scale linkage, a weighing lever of the first class, draft mechanism connecting the power end of the lever to the linkage, a pendulum pivoted to the weight end of the lever, said pendulum being a lever of the first class, the power end of the pendulum being a sector, a flexible member secured by one end to said end and lapping the circular face of the sector, the opposite end of said member being anchored independently of the weighing lever and across the fulcrum thereof whereby movement of the said lever will rock the pendulum relatively to the lever.

10. A scale comprising a weighing lever of the first class, draft means attached to one end of the lever, a pendulum carried on fixed bearings on the opposite end of the lever, said pendulum being a lever of the first class, means for varying the effective length of the pendulum, flexible means for attaching the power end of the pendulum lever to a point spaced from the weighing lever, said power end being so proportioned and arranged that the angularity of the attaching means will remain unchanged irrespective of the position of the pendulum lever relatively to the point of attachment of the attaching means.

11. A scale comprising a weighing lever of the first class, draft means attached to one end of the lever, rolling bearings carried by the lever, the fulcrum of the lever being between the draft means and the bearings, a pendulum carried on the outside of the rolling elements of the bearing, said pendulum being a lever of the first class, means for varying the effective length of the pendulum, flexible means for attaching the power end of the pendulum lever to a point spaced from the weighing lever, said power end being so proportioned and arranged that the angularity of the attaching means will remain unchanged irrespective of the position of the pendulum lever relatively to the point of attachment of the attaching means.

12. A scale comprising a platform mounted on a self-levelling scale linkage, a weighing lever of the first class pivoted in the casing and above the linkage, draft mechanism connecting the linkage with the power end of the lever, an arm carried by the weight end of the lever, a shaft in the casing being above and in alinement with the point of attachment of the draft mechanism and the linkage, a disc carried by the shaft, a rack and pinion connection between the disc and the arm to rotate the disc, a telltale finger pivoted in axial alinement with the shaft, a weighted lever of the first class pivoted in the casing, the weight tending to hold said lever in the vertical position, the unweighted end of the lever being pivotally connected to the finger by means of a link, the pivot of said lever being below and to one side of that of the finger.

This specification signed and witnessed this 2nd day of February, 1924.

HUGH M. CAMERON.

Witnesses:
SAMUEL ROTHENBERG,
WM. A. STUBBS.